US005828144A

United States Patent [19]

Murai

[11] Patent Number: 5,828,144

[45] Date of Patent: Oct. 27, 1998

[54] ELECTROMAGNETIC ACTUATOR

[75] Inventor: Masakazu Murai, Shibata, Japan

[73] Assignee: Keihin Corporation, Tokyo, Japan

[21] Appl. No.: 782,105

[22] Filed: Jan. 13, 1997

[51] Int. Cl.[6] ........................ H02K 33/02

[52] U.S. Cl. ........................ 310/30; 310/14; 310/17; 310/41

[58] Field of Search ........................ 335/261, 279, 335/274, 253; 310/41, 43, 14, 17, 23, 30

[56] References Cited

U.S. PATENT DOCUMENTS

| | | | |
|---|---|---|---|
| 2,356,577 | 4/1944 | Fuscaldo | 335/274 |
| 2,873,326 | 2/1959 | Kurtis | 310/14 |
| 3,509,505 | 4/1970 | Zagrzjiewski | 335/274 |
| 3,693,033 | 9/1972 | Troesh | 310/14 |

FOREIGN PATENT DOCUMENTS

| | | |
|---|---|---|
| 2-44177 | 3/1990 | Japan . |

*Primary Examiner*—Thomas M. Dougherty
*Assistant Examiner*—Tran N. Nguyen
*Attorney, Agent, or Firm*—Nikaido, Marmelstein, Murray & Oram LLP

[57] ABSTRACT

An electromagnetic actuator includes a housing made of a magnetic material, a coil disposed in the housing, a stationary core surrounded by the coil and secured to the housing, a movable core adapted to be attracted to the stationary core by excitation of the coil, a return spring for biasing the movable core away from the stationary core, and a joint member coupled to an outer end of the movable core. In this electromagnetic actuator, a cylindrical portion of the joint member made of a synthetic resin is coupled by press-fit to an outer peripheral surface of the movable core at its end, with a resilient locking claw formed on the cylindrical portion being engaged into an annular groove around the outer periphery of the movable core. Thus, the joint member of the movable core can be reliably coupled without use of a coupling member such as a pin or the like.

4 Claims, 10 Drawing Sheets

ELECTROMAGNETIC ACTUATOR

BACKGROUND OF THE INVENTION

1. Field of the Invention

The present invention relates to an electromagnetic actuator including a housing made of a magnetic material, a coil disposed in the housing, a stationary core surrounded by the coil and secured to the housing, a movable core adapted to be attracted to the stationary core by excitation of the coil, a return spring for biasing the movable core away from the stationary core, and a joint member coupled to am outer end of the movable core.

2. Description of the Related Art

Such an electromagnetic actuator is already known as disclosed in Japanese Utility Model Application Laid-open No.2-44177. In the known electromagnetic actuator, a spring pin is used to couple the movable core and the joint member in such a manner that the spring pin is laterally passed through both of the movable core and the joint member.

In a structure of coupling of the movable core and the joint member as described above, it is difficult to reduce the cost because a special coupling member, i.e., the spring pin is used. Moreover, if the spring pin should be disengaged, the joint member is removed, resulting in a defect in reliability.

SUMMARY OF THE INVENTION

Accordingly, it is an object of the present invention to provide an electromagnetic actuator of the above-described type, wherein the movable core and the joint member can be coupled to each other without use of a special coupling member and moreover, the reliability of such coupling is high.

To achieve the above object, according to a first aspect and feature of the present invention, there is provided an electromagnetic actuator including a housing made of a magnetic material, a coil disposed in the housing, a stationary core surrounded by the coil and secured to the housing, a movable core adapted to be attracted to the stationary core by excitation of the coil, a return spring for biasing the movable core away from the stationary core, and a joint member coupled to an outer end of the movable core, wherein the joint member is made of a synthetic resin and has a cylindrical portion formed thereon and coupled by press-fit to an outer peripheral surface of the movable core at its outer end, the cylindrical portion having a locking claw integrally formed thereon and locked to the outer peripheral surface of the movable core.

With the first feature of the present invention, the coupling of the movable core and the joint member can be achieved without use of a special coupling member, leading to a reduction in cost. Moreover, even if the press-fit coupling of the movable core and the joint member is loosened, the removal of the joint member can be prevented by the locking claw of the joint member, leading to a high reliability of the coupling.

According to a second aspect and feature of the present invention, in addition to the first feature, a flange is formed on the cylindrical portion of the joint member for carrying a movable end of the return spring mounted around the movable core.

With the second feature of the present invention, the return spring mounted around the movable core cannot constrict a magnetic path between both of the stationary and movable cores, in contrast with the case wherein the return spring is mounted between the stationary and movable cores, and hence, a good attracting force characteristic can be obtained. Moreover, a larger-diameter coil spring can be used and hence, even if the spring length is not increased, a low spring constant can be easily obtained, thereby providing both of a decrease in operation resistance of the movable core and a compactness of the actuator.

According to a third aspect and feature of the present invention, in addition to the second feature, the return spring is formed of a tapered coil spring, and is carried at a smaller-diameter end thereof on the housing and at a larger-diameter end thereof on the flange.

With the third feature of the present invention, a non-linear spring characteristic corresponding to the attracting force characteristic of the movable core can be provided to the return spring, and the mounting of the spring around the movable core can be easily performed from the larger-diameter end side.

According to a fourth aspect and feature of the present invention, in addition to the third feature, the joint member has a tapered portion provided around an outer periphery of the cylindrical portion thereof, the tapered portion being surrounded by the return spring and fitted in the larger-diameter end of the return spring.

With the fourth feature of the present invention, in mounting the return spring, the larger-diameter end of the return spring can be easily and properly set at a given position on the flange by guiding on the tapered portion.

The above and other objects, features and advantages of the invention will become apparent from the following description of the preferred embodiment taken in conjunction with the accompanying drawings.

DETAILED DESCRIPTION OF THE PREFERRED EMBODIMENT

The present invention will now be described by way of A preferred embodiment with reference to the accompanying drawings.

Figure 1:
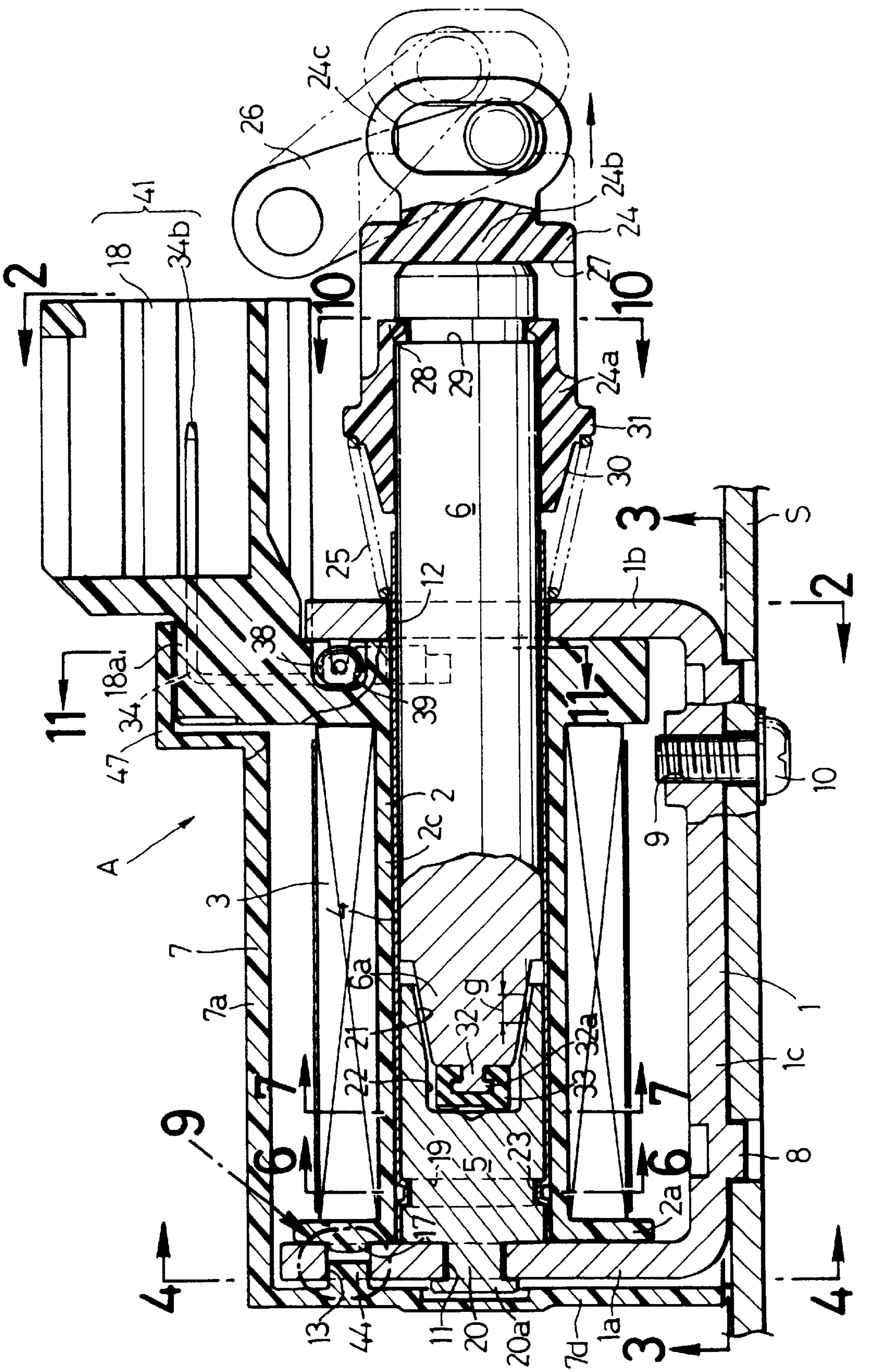
FIG. 1 is a vertical sectional side view of an electromagnetic actuator according to an embodiment of the present invention (a sectional view taken along a line 1—1 in FIG. 2)

Referring first to FIG. 1, an electromagnetic actuator A includes a housing 1, a bobbin 2, a coil 3, a guide sleeve 4, a stationary core 5, a movable core 6 and a cover 7 as primary elements.

Figure 2:
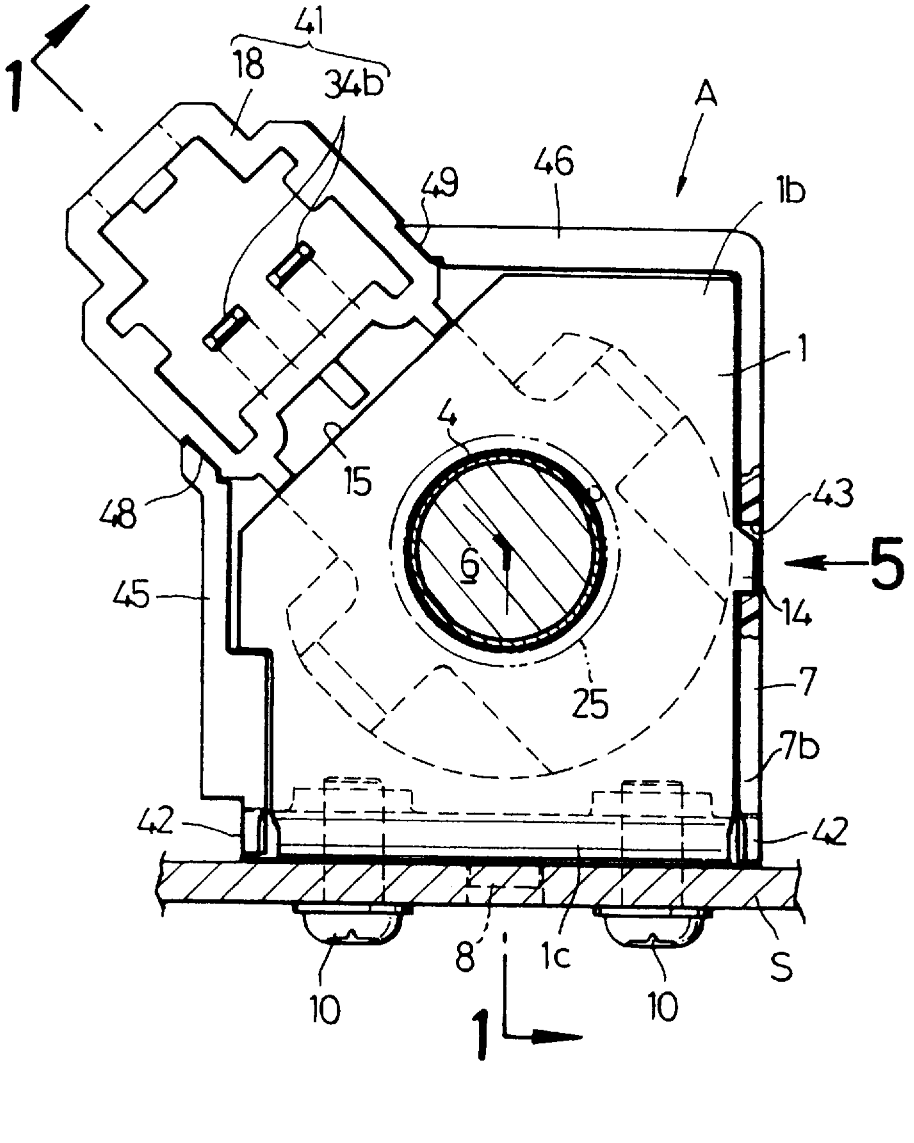
FIG. 2 is a sectional view taken along a line 2—2 in FIG. 1.
Figure 3:
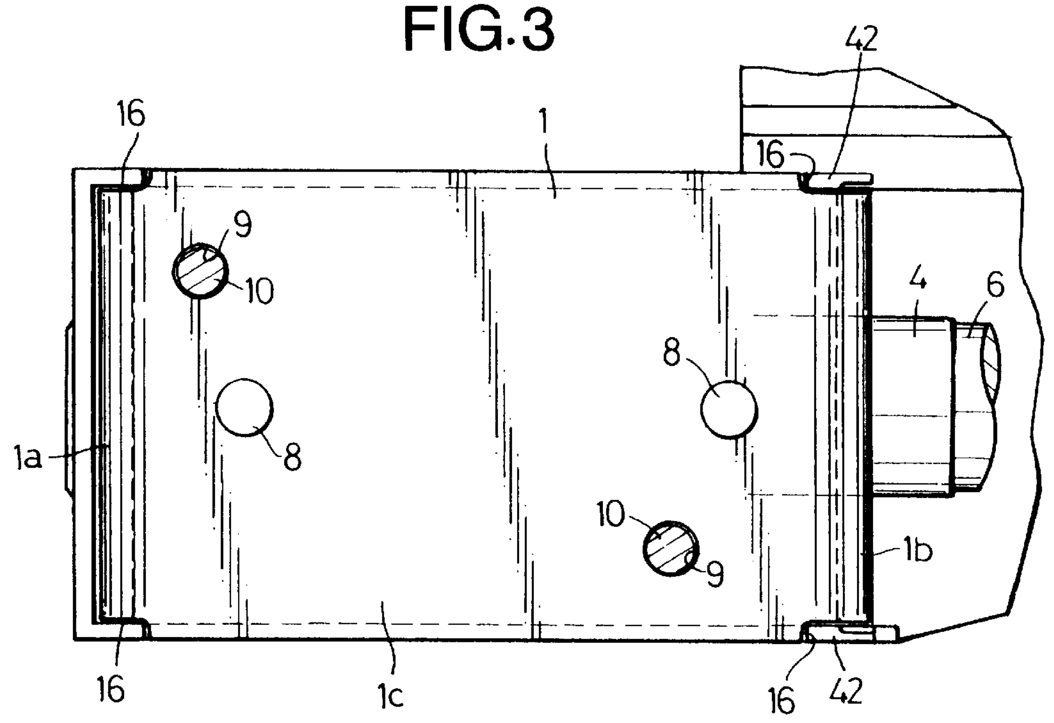
FIG. 3 is a sectional view taken along a line 3—3 in FIG. 1.
Figure 4:
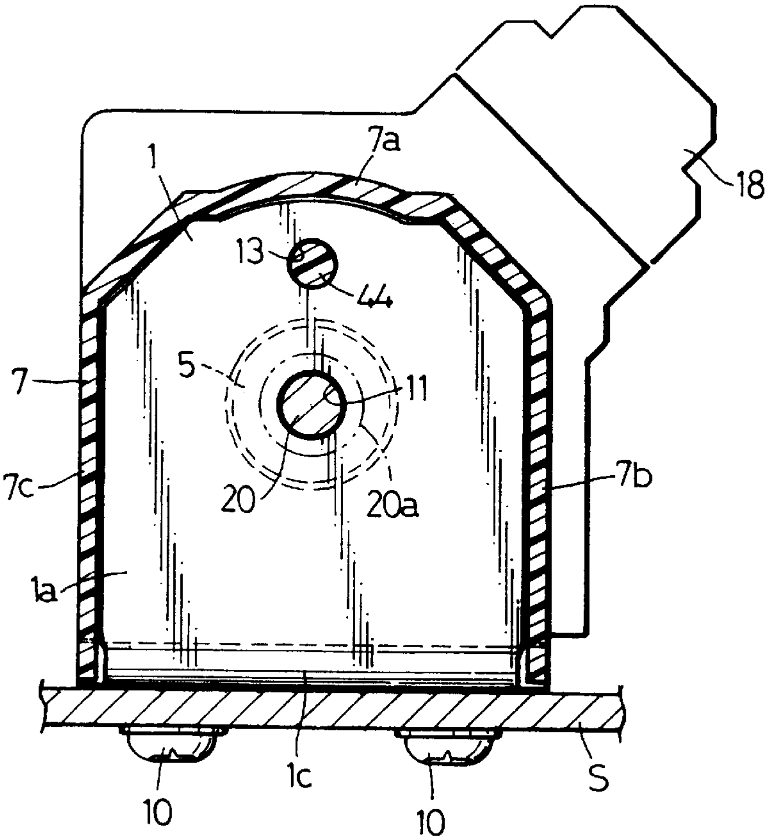
FIG. 4 is a sectional view taken along a line 4—4 in FIG. 1.

As shown in FIGS. 1 and 2, the housing 1 is made by pressing a single magnetic steel sheet into an angular U-shape, and includes left and right opposed end walls 1*a* and 1*b*, and a sidewall 1*c* which interconnects the left and right end walls 1*a* and 1*b*. The sidewall lo is provided with a positioning projection 8 and a mounting bore 9, and the electromagnetic actuator A is secured to a suitable support S at a given location by utilizing the positioning projection 8 and the mounting bore 9. The left end wall la of the housing 1 has a smaller-diameter support bore 11 provided at its central portion, and a positioning bore 13 defined sideways of the smaller-diameter support bore 11, and the right end wall 1*b* has a larger-diameter support bore 12 provided therein coaxially with the smaller-diameter support bore 11, a locking claw 14 formed sideways of the larger-diameter support bore 12, and a positioning slant 15 formed at its tip end corner.

Notches 16 are provided on opposite end faces of bent portions between the end walls 1*a* and 1*b* and the sidewall 1*c* of the housing 1. The notches 16 are previously formed when the housing 1 is of a flat plate-like shape and hence, when the bent portions are formed between the end walls 1*a* and 1*b* and the sidewall 1*c*, the protrusion of the opposite ends of such bent portions can be prevented.

The bobbin 2 is made of a synthetic resin and is comprised of a circular body 2*c* around which the coil 3 is wound, a thin flange 2*a* connected to a left end of the circular body 2*c*, and a thick flange 2*b* connected to a right end of the circular body 2*c*. The inside diameter of the circular body 2*c* is set at a value substantially equal to that of the larger-diameter support bore 12, and the distance between outer surfaces of the flanges 2*a* and 2*b* is set at a value substantially equal to the distance between inner surfaces of both the ends 1*a* and 1*b* of the housing 1. A positioning projection 17 is integrally formed on the outer surface of the thin flange 2*a* and capable of being fitted into the positioning bore 13. A coupler housing 18 is integrally connected to an outer peripheral edge of the thick flange 2*b* and extends axially outwards of such outer peripheral edge. The coupler housing 18 is formed integral with the bobbin 2.

By inserting the bobbin 2 into between both the end walls 1*a* and 1*b* of the housing 1, the thin flange 2*a* of the bobbin 2 is brought into close contact with the inner surface of the left end wall 1*a* of the housing 1, while the thick flange 2*b* is brought into close contact with the inner surface of the right end wall 1*b*. Further, the positioning projection 17 is fitted into the positioning bore 13, and the coupler housing 18 is put into abutment against the positioning slant 15. In this manner, the circular body 2*c* of the bobbin 2 is positioned coaxially with the larger and smaller support bores 11 and 12 in the housing 1.

Figure 9:
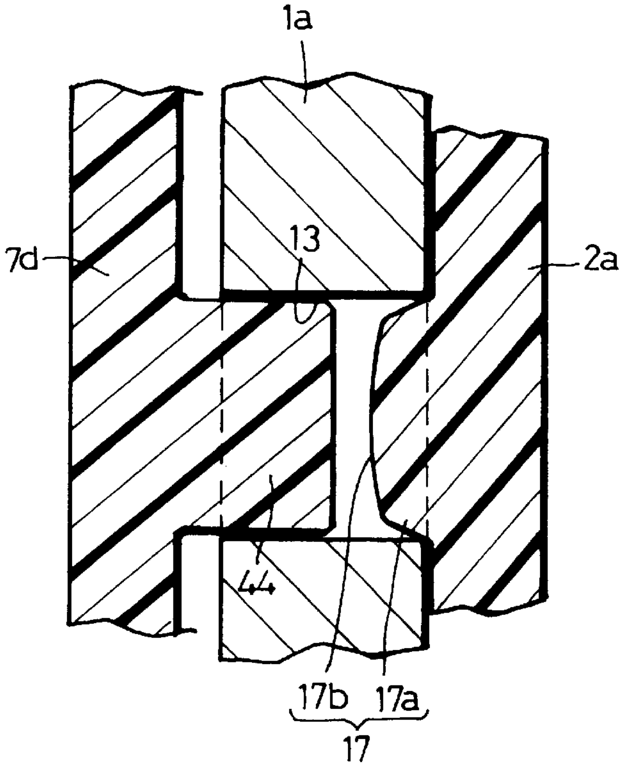
FIG. 9 is an enlarged view of a portion indicated by 9 in FIG. 1.

The positioning projection 17 of the bobbin 2 is comprised of a tapered portion 17*a* rising at a relatively sharp angle from the outer surface of the thin flange 2*a*, and a profiled portion 17*b* of a gentle angle connected to a small-diameter end of the tapered portion 17*a*, as shown in FIG.9, and is formed into a bowl-like shape as a whole. Thus, when the bobbin 2 is inserted into the housing 1 the positioning projection 17 is smoothly slid on the inner surface of the left end wall 1*a* of the housing 1, while slightly resiliently deforming the thin flange 2*a* by the profiled portion 17*b*, and the tapered portion 17*a* is fitted into the positioning bore 13 by a restoring force of the thin flange 2*a*. Therefore, the fitted state can be known with a high positioning accuracy and with a good moderation feeling.

The height of the positioning projection 17 is set at a sufficiently small value, as compared with the depth of the positioning bore 13. Thus, the positioning bore 13 can be also fitted over a positioning projection 44 (which will be described hereinafter) of the cover 7 from the side opposite from the projection 17.

The guide sleeve 4 made of a non-magnetic metal is fitted into the circular body 2*c* of the bobbin 2 and the larger-diameter support bore 12 in the housing 1, and the stationary core 5 and the movable core 6 are disposed within the guide sleeve 4.

Figure 6:
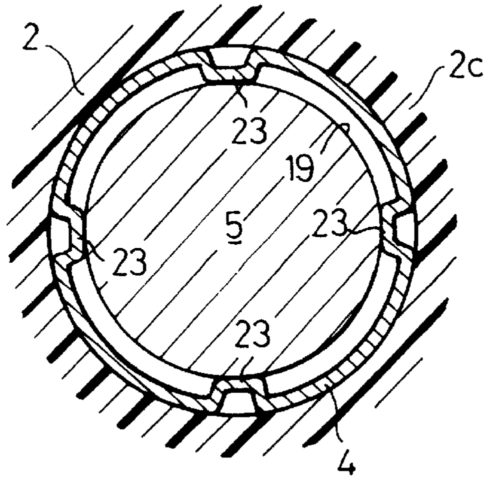
FIG. 6 is a sectional view taken along a line 6—6 in FIG. 1.

As shown in FIGS. 1 and 6, the stationary core 5 assumes a columnar shape and has an annular groove 19 defined around an outer periphery at one end thereof, and a small shaft 20 formed on one end face thereof. Further, the stationary core 5 is provided, at the other end thereof, with a tapered bore 21 which opens into the end face thereof, and a recess 22 connected to a smaller-diameter end of the tapered bore 21. The stationary core 5 is closely fitted to an inner peripheral surface at one end of the guide sleeve 4, and several caulking projections 23 bulged from the inner peripheral surface of the sleeve 4 are locked in the annular groove 19 by caulking a portion of the sleeve 4 corresponding to the annular groove 19 at several points. If such a caulking coupling is perforated, the formation of the caulking projections 23 can be achieved with a relatively light caulking force, and the distortion of the guide sleeve 4 and the stationary core 5 can be prevented, thereby assuring the coaxiality of the guide sleeve 4 and the stationary core 5.

The stationary core 5 is disposed with the small shaft 20 thereof being inserted through the smaller-diameter support bore 11 in the left end wall 1*a* of the housing 1 to be placed into close contact with the inner surface of the left end wall 1*a*. The outer end of the small shaft 20 is formed into an expanded portion 20*a* by the caulking. In this manner, the stationary core 5 is secured to the left end wall 1*a* of the housing 1. Therefore, the guide sleeve 4 is fitted to the housing 1 through the stationary core 5.

The other end of the guide sleeve 4 is loosely fitted in the larger-diameter support bore 12 in the right end wall 1*b* of the housing 1 and protrudes over a long distance outwards from the right end wall 1*b*. This protrusion increases the support span of the guide sleeve 4 for the movable core 6 and enables the inclination of the movable core 6 to be inhibited to the utmost. The loose fitting of the guide sleeve 4 into the larger-diameter support bore 12 contributes to the absorption of an error of the coaxiality of the guide sleeve 4 and the larger-diameter support bore 12.

The movable core 6 assumes a plunger-like shape and is slidably fitted into the guide sleeve 4. A joint member 24 is mounted to an outer end of the movable core 6 protruding from the guide sleeve 4, and a return spring 25 is mounted under compression between the joint member 24 and the right end wall 1*b* of the housing 1 for biasing the movable core 6 away from the stationary core 5. That is, the return spring 25 is mounted around the movable core 6.

Figure 10:
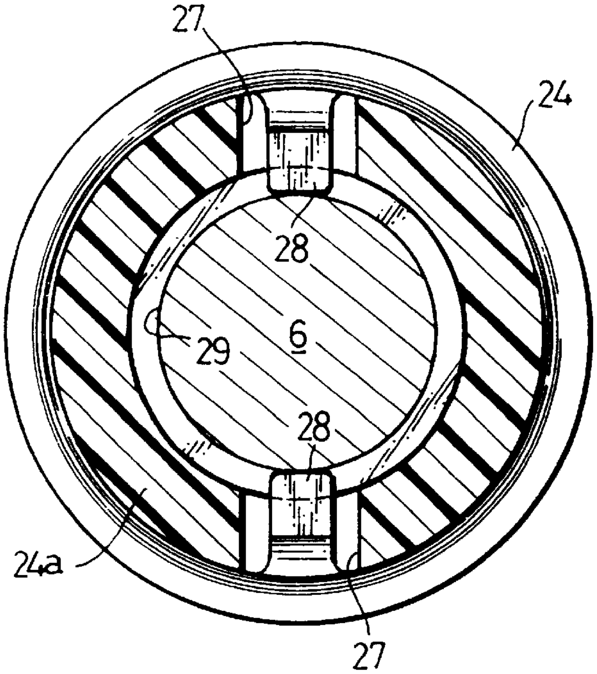
FIG. 10 is a sectional view taken along a line 10—10 in FIG. 1.

As shown in FIGS. 1 and 10, the joint member 24 is made of a synthetic resin and comprised of a cylindrical portion 24*a* at one end, and an eye portion 24*c* protruding the end wall 24*b* of the cylindrical portion 24*a*. The cylindrical portion 24*a* is coupled by press-fit to the outer peripheral surface of the movable core 6 at the outer end thereof, and an operated member 26 is connected to the eye portion 24*c*. The cylindrical portion 24*a* is integrally provided a plurality of lateral bores 27, and locking claws 28 made by bending claw portions at tip ends radially inwards to face the lateral bores 27. When the outer end face of the movable core 6 press-fitted into the cylindrical portion 24*a* is put into abutment against the end wall 24*b*, the locking claws 28 are engaged in the annular groove 29 around the outer periphery of the movable core 6 with its own resilient force. Therefore, even if the press-fitting coupling between the cylindrical portion 24*a* and the movable core 6 should be loosened, the disengagement of the joint member 24 can be prevented.

Further, a tapered portion 30 and a flange 31 rising from a larger-diameter end of the tapered portion 30 are formed on an outer peripheral surface the cylindrical portion 24*a* of the joint member 24 at an inner end thereof. On the other hand, the return spring 25 is formed of a coil spring, particularly, a tapered coil spring and has a smaller-diameter end fitted over the outer periphery of the guide sleeve 4 and carried on the right wall 1*b* of the housing 1, and a larger-diameter end fitted over the larger-diameter part of the tapered portion 30 and carried on the flange 31. The tapered portion 30 guides the setting of the larger-diameter end of the return spring 25 to a given position, and a tapered angle larger than the tapered angle of the spring 25 is provided to the tapered portion 30 in order to avoid the interference with the return spring 25 when the return spring 25 is expanded or compressed.

Figure 15:
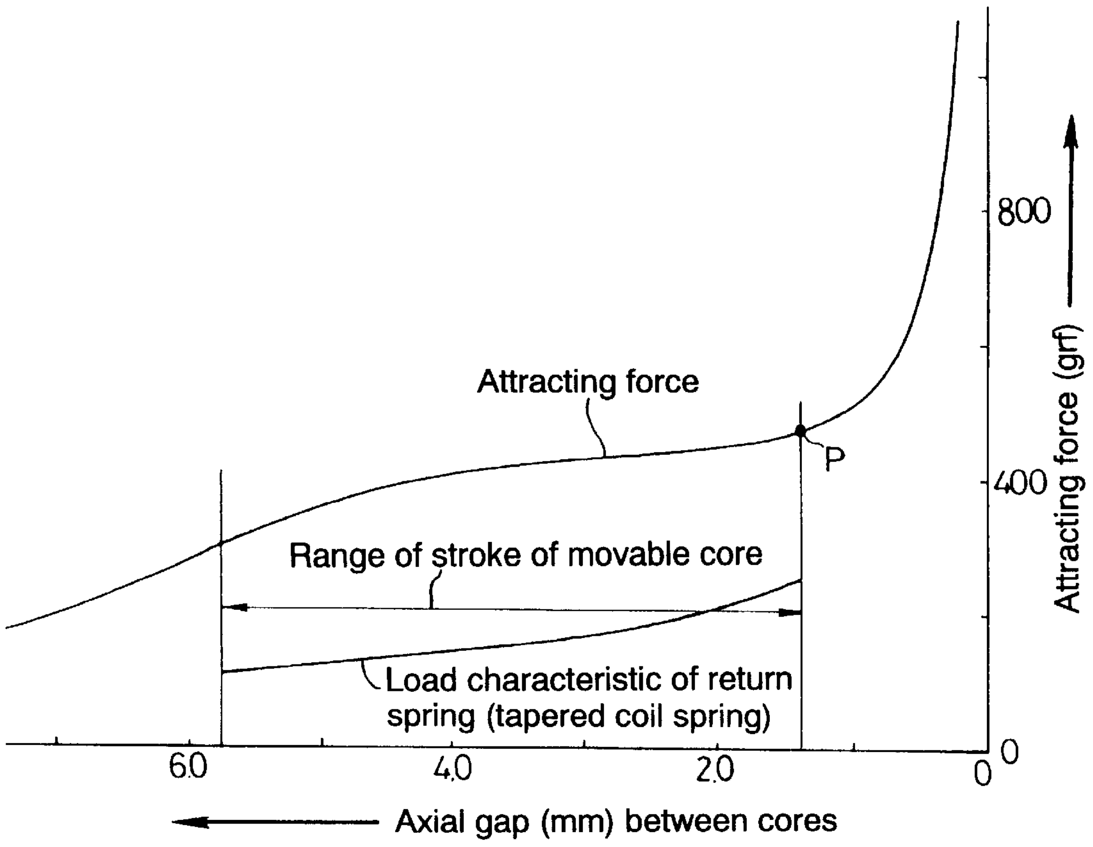
FIG. 15 is a diagram of a stroke/attracting force characteristic of the electromagnetic actuator.

The return spring 25 mounted around the movable core 6 can be formed at a sufficient larger diameter so that it is not interfered by the other member and hence, a low spring constant can be generally provided to the return spring 25, while shortening the axial length thereof. Especially, by use of the tapered coil spring, the return spring 25 can possess a non-linear characteristic as shown in FIG. 15. More specifically, the return spring 25 has a characteristic that it has a lower spring constant in the first half of the compression thereof and a higher spring constant in the second half of the compression. Moreover, the return sprint 25 is supported by the guide sleeve 4 and the larger-diameter part of the tapered portion 30 and hence, when the return spring 25 compressed, a falling or buckling is not produced.

Figure 7:
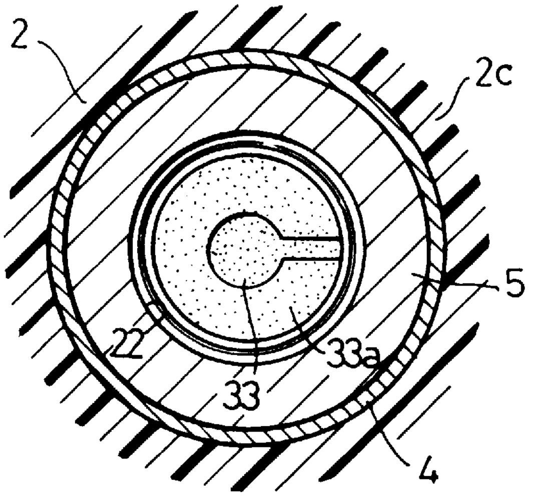
FIG. 7 is a sectional view taken along a line 7—7 in FIG. 1.
Figure 8:
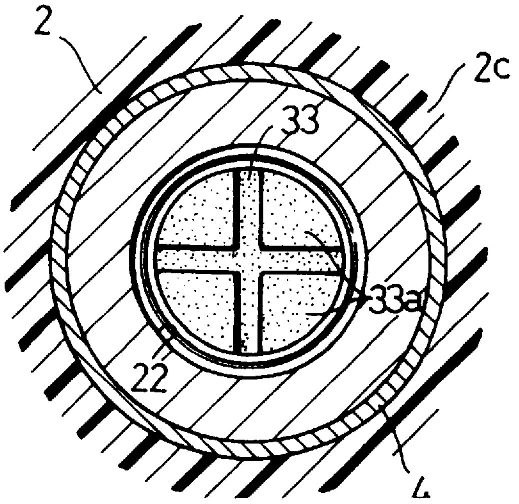
FIG. 8 Is a sectional view similar to FIG. 7, but illustrating a variant of a resilient stopper.

Referring again to FIG. 1, the movable core 6 has, at its inner end, a tapered shaft 6*a* corresponding to the tapered bore 21 in the stationary core 5. A small shaft 32 having an expanded head portion 32*a* is projectingly provided on an end face of the tapered shaft 6*a*, and a resilient stopper 33 made of a rubber or the like is mounted to the small shaft 32. The resilient stopper 33 is adapted to be put into abutment against a bottom surface of the recess 22 of the stationary core 5 to limit the proximity distance g of the movable core 6 to the stationary core 5 to a given value, wherein a shock of such abutment is absorbed by the compressive deformation of the resilient stopper 33 itself. A C-shaped or cross-shaped projection 33*a* as shown in FIGS. 7 and 8 is formed on an end face of the resilient stopper 33 to prevent the sticking of the resilient stopper 33 when the latter has been put into abutment against the bottom surface of the recess 22.

If an electric current is now supplied to the coil 3 to excite the latter, an attracting force is generated between the stationary and movable cores 5 and 6 by a magnetic flux flowing to the stationary and movable cores 5 and 6 through the housing 1, whereby the movable core 6 is moved from a position shown by a dashed line in FIG. 1 toward the stationary core 5 while compressing the return spring 25 to operate the operated member 26. At this time, the proximity distance g between both the cores 5 and 6 is limited to a particular value by abutment of the resilient stopper 33 of the movable core 6 against the bottom surface of the recess 22.

As shown in FIG. 15, the attracting force between both the cores 5 and 6 is gradually increased until the axial distance between both the cores 5 and 6 is decreased to the particular value, and when the axial distance is decreased to be lower than such particular value, the attracting force is sharply increased. Thus, the movable core 6 can be operated while sufficiently assuring the stroke of the movable core 6 under a relatively stable attracting force by limiting the proximity distance between both the cores 5 and 6 as described above in order to define a starting point P of the sharp increase in attracting force or a near point short of the starting point as an operation limit of the movable core 6. Therefore, a driving force for the operated member 26 can be stabilized regardless of the dimensional error of the resilient stopper 33 and the recess 22.

In this case, the tapered coil spring having the non-linear characteristic is used as the return spring 25 as described above and hence, during stroking of the movable core 6, a variation in difference between the attracting force between both the cores 5 and 6 and the load of the return spring 25 is small, and an increase in shock force of operation of the movable core 6 can be suppressed to the utmost.

In addition, the guide sleeve 4 is secured directly to the stationary core 5 and hence, even if the guide sleeve 4 receives a side thrust from the movable core 6, the coaxiality between the guide sleeve 4 and the stationary core 5 cannot get out of order. Therefore, the coaxiality between both the cores 5 and 6 can be always maintained by the guide sleeve 4 to properly guide the reciprocal movement of the movable core 6 and to exhibit a stable performance.

Further, since the housing 1 is made by pressing the single magnetic steel sheet into the angular U-shape, there is no magnetic loss between the end walls 1*a* and 1*b* and the sidewall 1*c*, and a large attracting force can be exerted to both the cores 5 and 6.

It is not necessary to interpose a conventional resilient ring between the guide sleeve 4 and the stationary core 5 and hence, it is possible to reduce the number of parts and in its turn, to provide a simplified structure.

Figure 11:
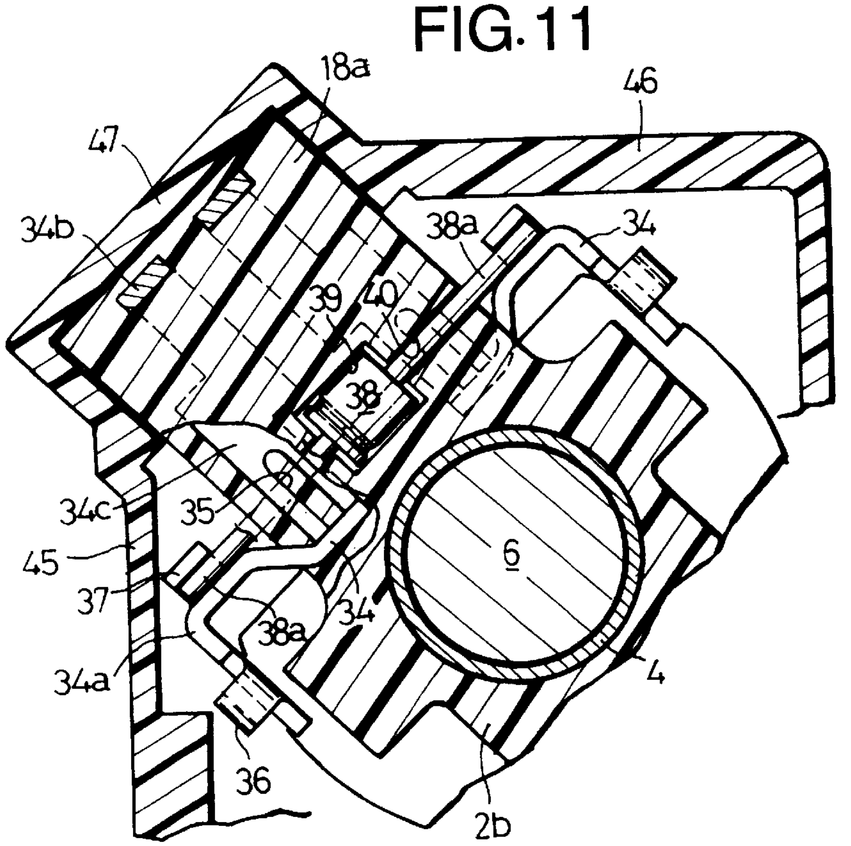
FIG. 11 is a sectional view taken along a line 11—11 in FIG. 1.
Figure 12:
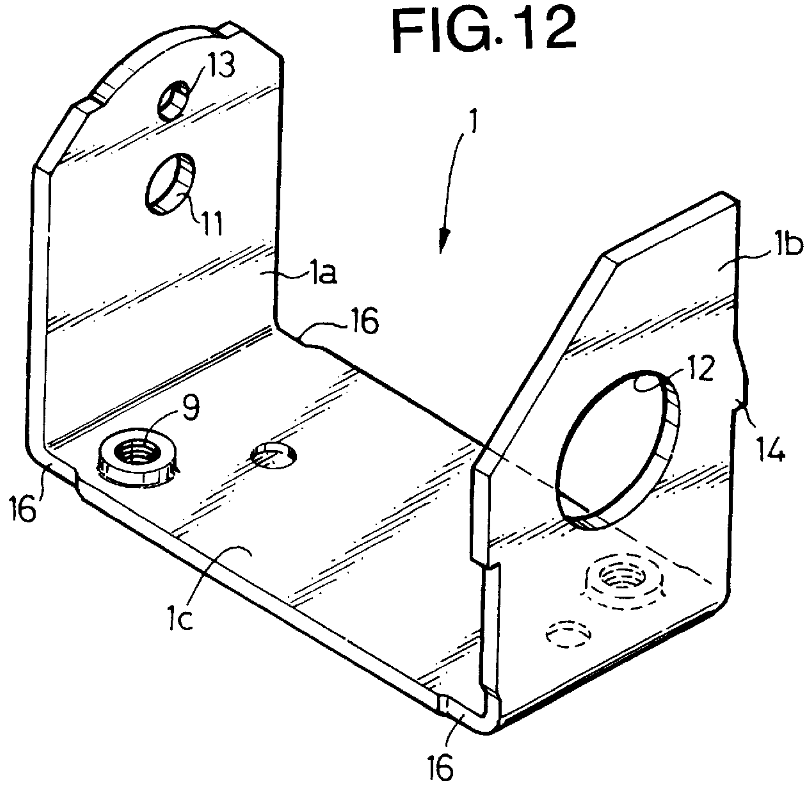
FIG. 12 is a perspective view of a housing.
Figure 13:
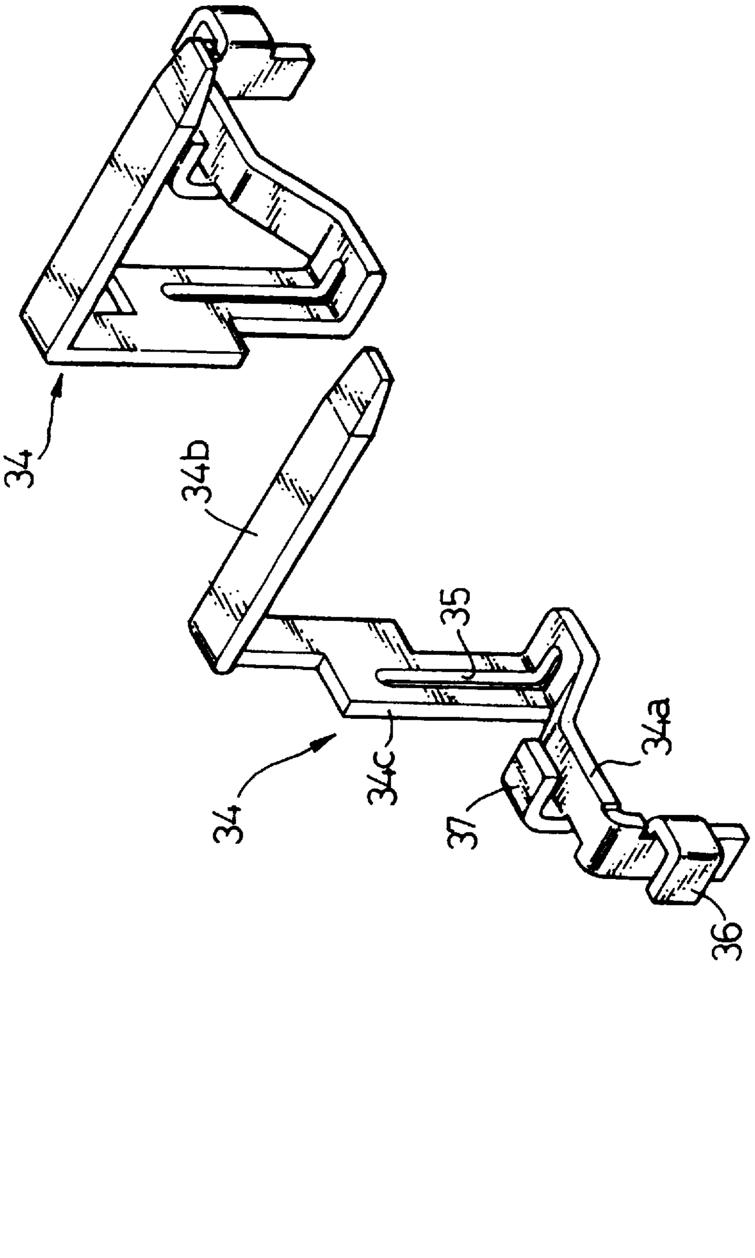
FIG. 13 is a perspective view of an terminal member.

Referring to FIGS. 1, 11 and 13, a pair of terminal members 34 are mode-coupled to extent from the thick flange 2*b* of the bobbin 2 to the coupler housing 18. Each of the terminal members 34 is made by pressing a single conductive plate and comprised of a connecting plate 34*a* disposed around the outer periphery of the thick flange 2*b*, a coupler terminal 34*b* disposed within the coupler housing 18, and an intermediate plate 34*c* which connects the connecting plate 34*a* and the coupler terminal 34*b* to each other. The intermediate plate 34*c* has a coupling bore 35. The intermediate plate 34*c* is mold-coupled to the thick flange 2*b* and the coupler housing 18 and hence, by filling the coupling bore 35 with a synthetic resin surrounding the intermediate plate 34*c* the coupling of the intermediate plate 34*c* to the thick flange 2*b* and the coupler housing 18 is reinforced.

The connecting plate 34*a* of each terminal member 34 includes a pair of connecting pieces 36 and 37 arranged circumferentially of the thick flange 2*b*, and a terminal of the coil 3 is caulked and electro-deposited to the connecting piece 36 on a tip end side. A terminal rod 38*a* of a noise-preventing diode 38 is caulked and electro-deposited to the other connecting piece 37. A recess 39 and a recessed groove 40 for accommodating the diode 38 and the terminal rod 38*a* are formed in the outer end face of the thick flange 2*b* and have openings which are closed the right end wall 1*b* of the housing 1 which is in close contact with the outer and face of the thick flange 2*b*. Thus, the diode 38 can be protected from the contact with another object and the entering of dusts.

The coupler housing 18 and the pair of coupler terminals 34*b* constitute a coupler 41 to which a coupler of a power source (not shown) is connected.

Figure 5:
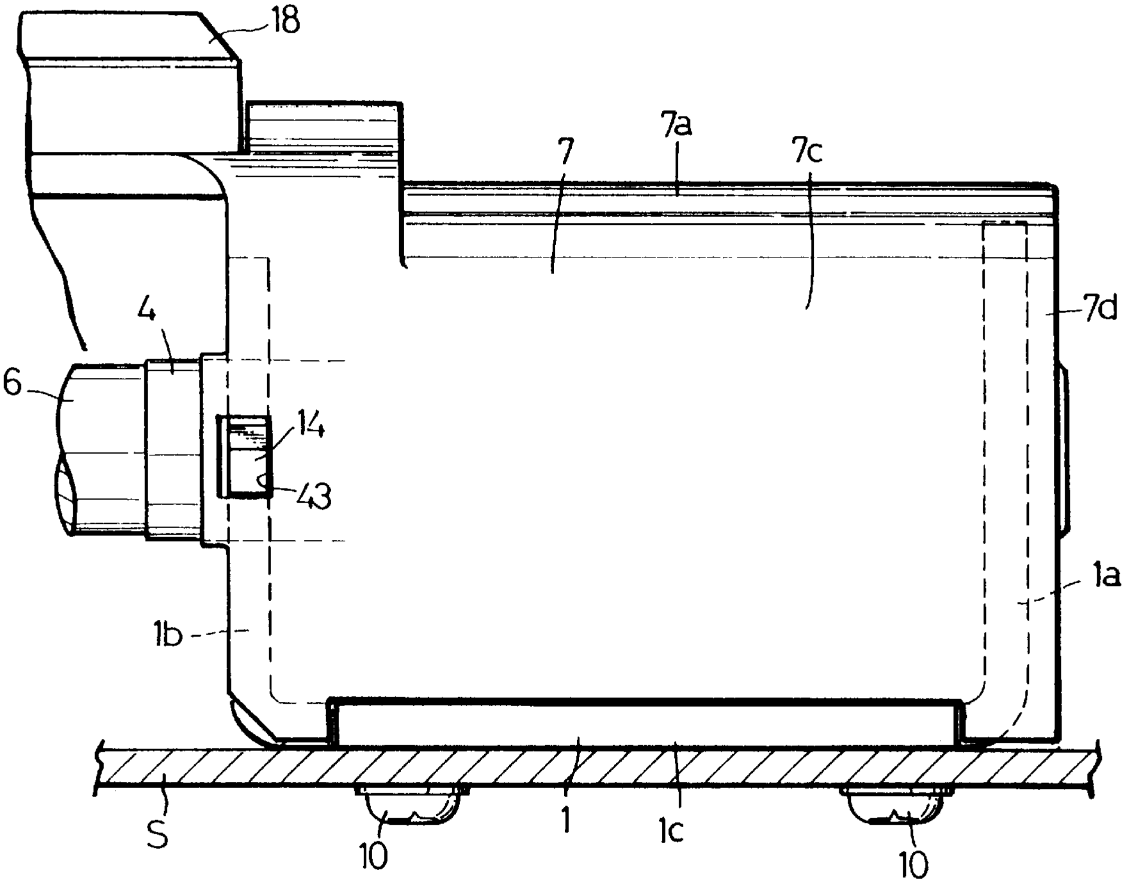
FIG. 5 is a view taken along an arrow 5 in FIG. 2.

Referring to FIG. 1 and 5, the cover 7 made of a synthetic resin for covering the coil 3 to guard the coil 3 from rain water and dusts is mounted to the housing 1. The cover 7 has a ceiling wall 7*a*, a pair of sidewalls 7*b* and 7*c* and an end wall 7*d*, which cover four faces excluding the right end wall 1*b* and the sidewall 1*c* of the housing 1. A locking claw 42 capable of being engaged into the pair of notches 16 in the right end wall 1*b* of the housing 1 is formed on an end edge of each of the sidewalls 7*b* and 7*c*; a locking bore 43, into which the looking claw 14 of the housing 1 can be engaged, is defined in the sidewall 7*c*; and the positioning projection 44 capable of being engaged into the positioning bore 13 in the housing 1 is formed on the end wall 7*d*.

Thus, if the housing 1 is inserted into the cover 7 from the side of the left end wall 1*a*, the positioning projection 44 is fitted into the positioning bore 13, whereby the left end wall 1*a* of the housing 1 is put into abutment against the end wall of 7*d* of the cover 7, while at the same time, the looking claw 42 is resiliently engaged into the notch 16 in the right end wall 1*b* of the housing 1, and the locking claw 14 is resiliently engaged into the locking bore 43. In this manner, the cover 7 is mounted at a given position on the housing 1 without use of a fixing member such as a machine screw or the like.

The ceiling wall 7*a* and one of the sidewalls 7*b* of the cover 7 are integrally provided with a pair of reinforcing plates 45 and 46 disposed with the coupler housing 18 interposed therebetween, and a reinforcing corner portion 47 fitted over the a stepped neck portion 18*a* of the coupler housing 1*a* and interconnecting the reinforcing plates 45 and 46.

On the other hand, groove-like guide rails 48 and 49 are formed on the outer surface of the coupler housing 18, and opposed side edges of the reinforcing plates 45 and 46 are slidably engaged with the groove-like guide rails 48 and 49 in a direction of insertion of the housing 1 into the cover 7.

Thus, When the housing 1 is inserted into the cover 7, the mounting of the cover 7 can be easily performed by bringing the pair of reinforcing plates 45 and 46 into engagement with the guide rails 48 and 49 while sliding them. Moreover, since the coupler housing 18 is clamped by both the reinforcing plates 48 and 49 with the stepped neck portion 18*a* being fitted into the reinforcing corner portion 47, the coupler housing 18 can be effectively reinforced by the reinforcing plates 48 and 49 and the reinforcing corner portion 47. Therefore, the coupler 41 can sufficiently withstand the load of insertion from the power source coupler and the flexural load.

Figure 14A:
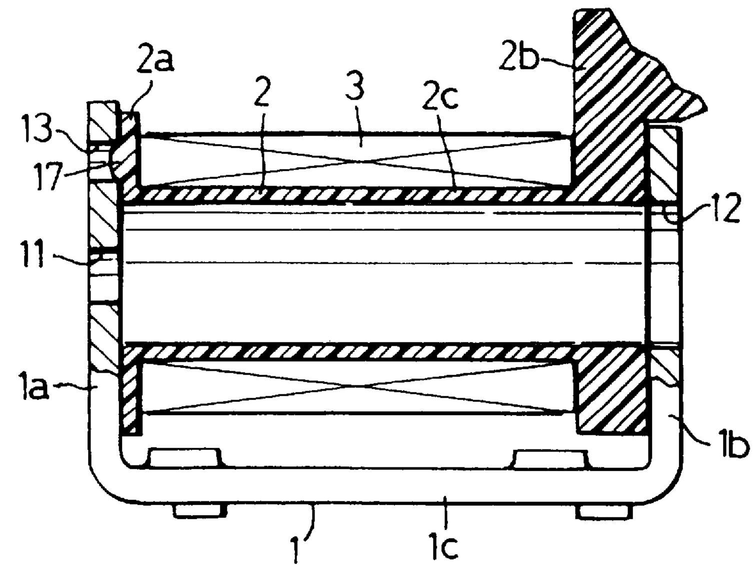
FIGS. 14A, 14B and 14C are view for illustrating steps of assembling the electromagnetic actuator.
Figure 14B:
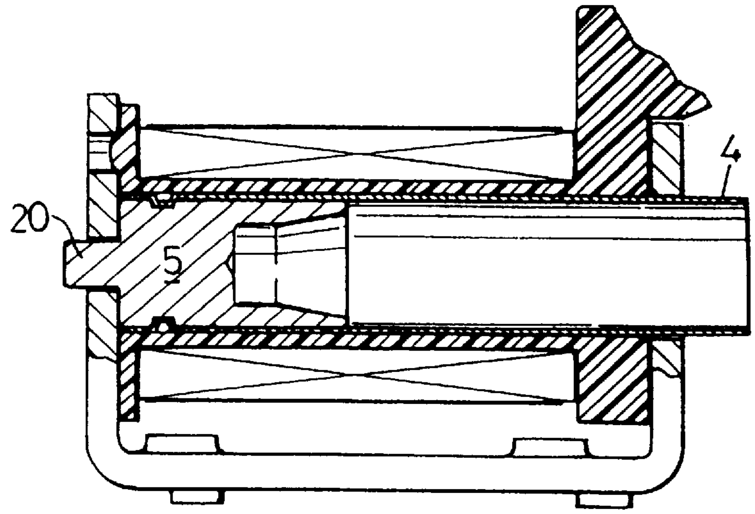
Figure 14C:
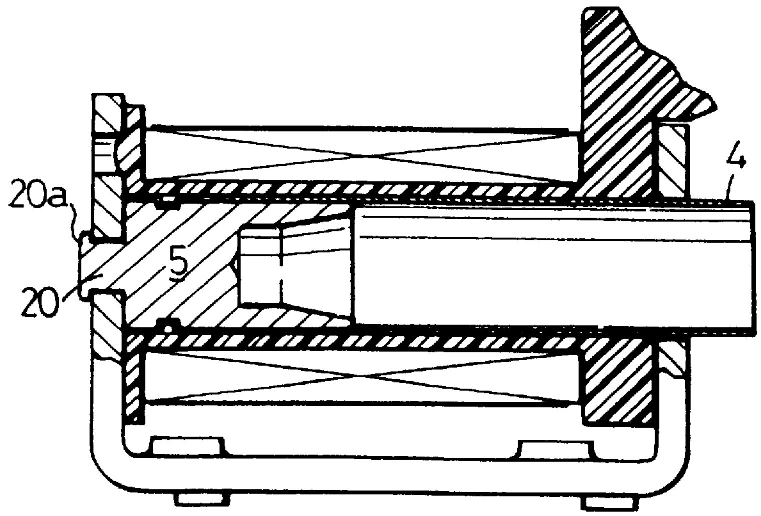

In the assembling of such electromagnetic actuator A, the assembly of the bobbin 2 and the coil 3 including the coupler 41 is first inserted into the housing 1, as shown in FIG. 14A, and then, the guide sleeve 4 caulked to the stationary core 5 is inserted into the larger-diameter support bore 12 and the circular body 2*c* of the bobbin 2, while the small shaft 20 of the stationary core 5 is inserted into the smaller-diameter support bore 11 in the housing 1, as shown in FIG. 14B. Then, as shown in FIG. 14C, the outer end of the small shaft 20 is caulked to form the enlarged portion 20*a*, and the stationary core 5 is secured to the housing 1. Then, as shown in FIG. 1, the cover 7 is mounted to the housing 1 and finally, the movable core 6 with the joint member 24 attached thereto is fitted into the guide sleeve 4 in such a manner that the return spring 25 is sandwiched between the movable core 6 and the housing 1.

In such assembling steps, especially, the disengagement of the guide sleeve 4 and the bobbin 2 from the housing 1 is can be inhibited at once by caulking the stationary core 5 to the housing 1, leading to a reduced number of assembling steps, and an enhanced efficiency of the assembling operation.

Although the embodiment of the present invention has been described in detail, it will be understood that the present invention is not limited to the above-described embodiment, and various modifications in design may be made without departing from the spirit and scope of the invention defined in claims. For example, the stationary core and the guide sleeve may be coupled by welding, brazing or the like in place of caulking.

What is claimed is:

1. An electromagnetic actuator comprising a housing made of a magnetic material, a coil disposed in the housing, a stationary core surrounded by the coil and secured to the housing, a movable core, a return spring for biasing the movable core away from the stationary core, and a joint member coupled to an outer end of the movable core, wherein said movable core is attracted to the stationary core upon excitation of the coil, and wherein said joint member is made of a synthetic resin and has a cylindrical portion formed, thereon and coupled by press-fit to an outer peripheral surface of said movable core at an outer end of said movable core, said cylindrical portion having a locking claw integrally formed on said joint member and locked to the outer peripheral surface of said movable core, wherein said joint member has a flange formed on the cylindrical portion thereof for carrying a movable end of said return spring mounted around said movable core, and wherein said return spring is formed of a tapered coil spring, and is carried at a smaller-diameter end thereof on said housing and at a larger-diameter end thereof on said flange.

2. An electromagnetic actuator according to claim 1, wherein said joint member has a tapered portion provided around an outer periphery of the cylindrical portion thereof, said tapered portion being surrounded by said return spring and fitted in the larger-diameter end of said return spring.

3. An electromagnetic actuator comprising a housing made of a magnetic material, a coil disposed in the housing, a stationary core surrounded by the coil and secured to the housing, a movable core, a return spring for biasing the movable core away from the stationary core, and a joint member coupled to an outer end of the movable core, wherein said joint member is configured to be connected to a member to be operated by said electromagnetic actuator, wherein said movable core is attracted to the stationary core upon excitation of the coil, and wherein said joint member is made of a synthetic resin and has a cylindrical portion formed thereon and coupled by press-fit to an outer peripheral surface of said movable core at an outer end of said movable core, said cylindrical portion having a locking claw integrally formed on said joint member and locked to the outer peripheral surface of said movable core.

4. An electromagnetic actuator according to claim 3, wherein said joint member has a flange formed on the cylindrical portion thereof for carrying a movable end of said return spring mounted around said movable core.

* * * * *